March 25, 1969    D. J. L. GRIFFITHS ET AL    3,434,901
METHOD FOR MANUFACTURING CORRUGATED BOARD
Filed Oct. 23, 1965
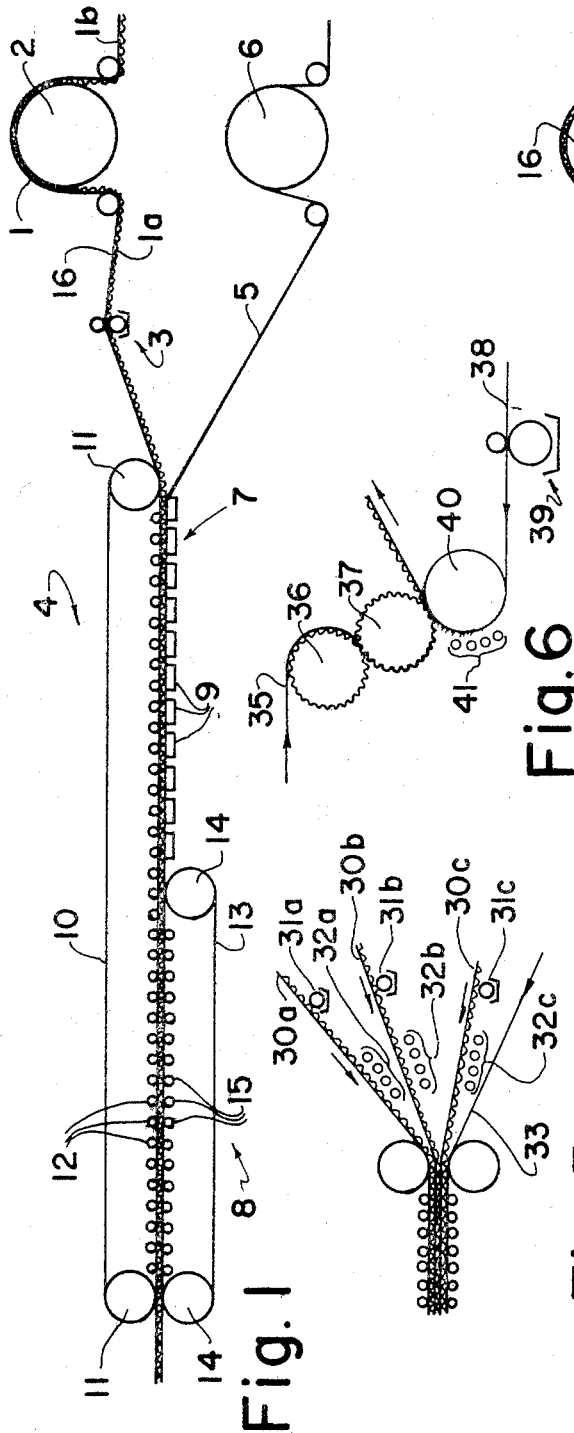
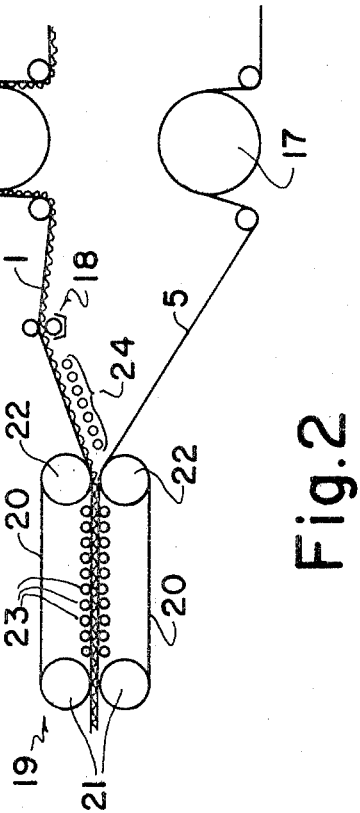
INVENTORS
Darrell J.L. Griffiths
Kenyon W. Miller
Willem A. Nikkel
BY
Thomas W. Flynn
ATTORNEY

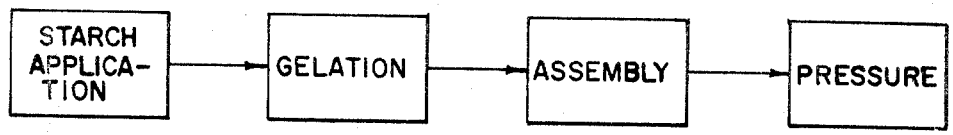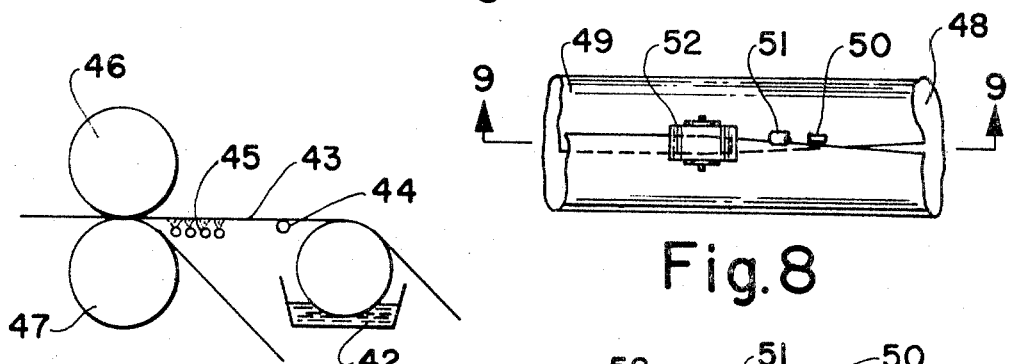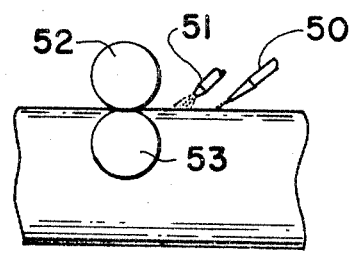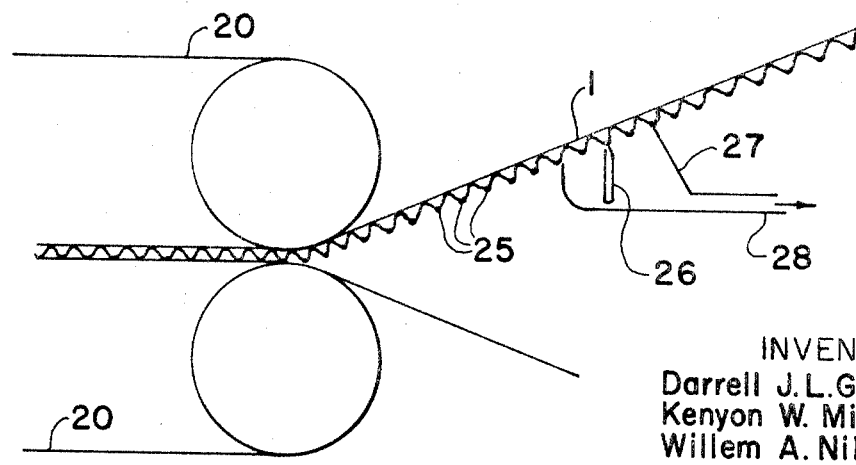

3,434,901
METHOD FOR MANUFACTURING CORRUGATED BOARD
Darrell J. L. Griffiths, Silver Spring, Md., Kenyon W. Miller, Bellmawr, N.J., and Willem A. Nikkel, Covington, Va., assignors to West Virginia Pulp and Paper Company, New York, N.Y., a corporation of Delaware
Filed Oct. 23, 1965, Ser. No. 503,795
Int. Cl. B31f 1/22; C09j 3/06
U.S. Cl. 156—210                                 7 Claims

ABSTRACT OF THE DISCLOSURE

In lamination processes in which a raw starch is suspended in a suitable carrier and gelatinized to form an adhesive, the raw starch is gelatinized after it is applied to a substrate but before the lamina are brought together. Gelatinization may be accomplished by either heating the starch, applying a gel point depressing additive to lower the gel point below the starch temperature, or a combination of both methods.

---

The present invention is directed to adhesive bonding and more particularly, to a method for bonding with raw or uncooked starch.

In bonding with raw starch the general practice is to prepare a suspension of uncooked starch granules in a suitable carrier and apply this mixture to the substrate. In this state, the raw starch has little or no adhesive effect on the surfaces of the materials to be bonded together, nor is there any interreaction between the starch granules themselves. However, at a certain temperature, dependent upon the starch source and additives included in the mixture, gelatinization will occur and the starch will assume adhesive characteristics and permit the formation of a good bond. Gelatinization, it may be noted, is the phenomenon whereby, at a certain temperature, the starch granules in a suspension absorb all or most of the available liquid of suspension, swelling, and almost instantaneously transforming the relatively low viscosity mixture to a solution of jelly-like consistency.

Prior to applicants' invention, it had been assumed that in order to successfully utilize raw starch to bond two or more substrates together, post assembly gelation was necessary; that is, that gelation must occur in situ after the coated substrate and adherend had been brought together under pressure with the starch in between. Therefore, in the conventional process, after the substrate is coated with the raw starch suspension, the adherend is brought into contact therewith and the entire assembly heated under pressure until at least the gel point of the adhesive is reached.

It will be obvious that this process, from a standpoint of heat transfer, is grossly inefficient. Thus, although the purpose of applying heat is to raise the temperature of the starch per se, the entire assembly is heated and the temperature of both substrates, as well as the starch, raised to a point above that necessary for gelation.

It will also be obvious that the strength and appearance of many substrates are impaired when heated to high temperatures. Where, for example, the lamina are paper, applying heat to the assembly during bonding will usually result in warpage and, if temperatures are sufficiently high, the strength of the paper will be seriously affected.

Typical of the extent to which these obviously undesirable characteristics of the present bonding process are tolerated in order to permit post assembly gelation is the practice followed in the corrugating industry; which, at present, is the major consumer of raw starch adhesives.

As will be explained in detail below, the double backer operation of the corrugating process has long been recognized as the major impediment to high speed, automatic production of corrugated board. Yet, the obvious drawbacks of the present operation have been tolerated for many years because post assembly gelation was considered necessary to obtain satisfactory bonds when using raw or uncooked starch.

As indicated above, in the post assembly gelation bonding process there is little adhesion between the substrates when they are first brought together and bonding does not occur until after the starch has gelled. In operations where high initial tack and fast bond is important, this disadvantage is serious enough to militate against the use of uncooked starch. For example, vinyl resin emulsions are presently used with high speed, automatic packaging machinery despite the fact that they are much more expensive than raw starch because of their ability to set quickly.

It is therefore, an object of the present invention to eliminate the disadvantages noted above of prior art bonding processes utilizing raw starch and additionally, render possible the use of raw starch in environments where fast setting synthetics are now preferred. This is accomplished through applicants' discovery that, contrary to accepted practice, gelation of the raw starch need not take place after assembly of the substrates under pressure, but may occur after application to the substrate and before assembly of the laminae.

Thus, heat may be applied directly to the starch suspension and gelation obtained without heating the entire assembly of laminae and adhesive. This results in greater thermal efficiency with lower operating costs and less capital expenditure for heating equipment.

Additionally, in forming paper laminates, for example, heat need not be applied during the bonding of the laminae; permitting the production of warp free laminates. As a result, a more uniform product is obtained, rendering subsequent converting operations more adaptable to high speed, automatic processes.

Further, because heat may be applied directly to the starch suspension, less time is required to gel the starch and bonding times are drastically decreased.

It will also be seen that through the present invention raw starch may now be used in environments where high initial tack is necessary, since gelation prior to assembly renders the starch adhesive tacky.

It has also been found that by applying moderately high pressures to the assembly of laminae and pregelled adhesive an almost instantaneous bond may be obtained. Thus, in operations where expensive synthetics, such as polyvinyl acetate, are now preferred because of their low bonding time, raw starch can now be used at a fraction of present cost and even faster bonding obtained.

It will also be seen that by means of the present invention, an alternative to bonding by heat application is offered. Thus, while it has long been known in the art that certain chemical additives will depress the gel point of an uncooked starch suspension, this knowledge heretofore has been used only to the extent of adding limited amounts of chemicals to the suspension prior to application in order to reduce the amount of heat necessary for post assembly gelation. However, through applicants' discovery that post assembly gelation is unnecessary and that gelation may occur after adhesive application but before assembly of the laminae, gel point depressing chemicals may be applied to the adhesive coated substrate in quantities sufficient to depress the gel point of the coating below its temperature and bonding obtained without additional heat application.

These and other features and advantages of the present invention will become more readily apparent from the following detailed description wherein:

FIGURE 1 is a view of a conventional, prior art, double backer operation in the production of corrugated board;

FIGURE 2 is a similar view of a double backer operation in accordance with the principles of the present invention;

FIGURE 3 is a block diagram of the basic process steps of the present invention;

FIGURE 4 is an illustration of a second embodiment of the invention;

FIGURE 5 shows the present invention as applied to the production of triple wall, corrugated board;

FIGURE 6 shows the production of single face board by means of the present invention;

FIGURE 7 is an illustration of another embodiment of the invention; and

FIGURES 8 and 9 are top and side views, respectively, of still another embodiment of the invention.

As noted previously, the major consumer of raw starch adhesives at present is the corrugating industry. Therefore, although the present invention is directed to bonding generally and not to bonding specifically in the manufacture of corrugated board, the corrugating process does offer a convenient illustration of the many advantages to be gained by modifying a conventional process in light of the present invention. Therefore, as a basis of comparison, a typical, prior art, double backer operation is shown in FIGURE 1. As seen in FIGURE 1, single faced board 1, consisting of a web of corrugated medium 1a having a coextensive web of liner material 1b bonded to the tips of the corrugations on one side thereof, is trained over a preheater drum 2. The single face 1, after having its temperature raised to 150–200° F. by the preheater 2, is then passed over an adhesive applicator 3 and into the combining section 4. A web of outside liner 5 is also trained over a preheater 6 and thence, into the combining section 4 where it is pressed against the adhesive covered flute tips of the single face board.

The combining section consists, basically, of two parts: a hot plate section 7 and a draw section 8. Heat is applied in the hot plate section by a series of steam heated chests 9 having their upper porions aligned to provide a heated, substantially continuous surface. An endless belt 10, trained about a pair of driven rollers 11 and having a series of smaller rollers 12 bearing on its lower reach, serves to press the single face and outside liner toward the steam chests 9. A second belt 13, trained about driven rollers 14 and pressure rollers 15, cooperates with the downstream portion of the belt 10 to grip the assembled single face and outside liner and draw them through the double backer apparatus.

The adhesive applied to the flute tips of the single face 1 at the applicator 3 is typically a suspension of raw or uncooked starch in a suitable liquid carrier. For example, raw corn, tapioca or potato starch, comprising 10–40% by weight of the adhesive, suspended in a carrier consisting of water and smaller amounts of cooked starch, borax and caustic soda would constitute a typical raw starch formulation. In this state, the starch has litle or no adhesive qualities. However, at a certain temperature, dependent upon the type of starch utilized and the kind and amount of additives dissolved in the carrier, the starch granules will absorb the liquid of suspension available and swell, causing gelation of the suspension. In this state the starch has superior adhesion abilities and will form a good bond between many substrates, including paper.

The temperature at which gelation occurs for any particular formulation can easily be determined by heating the starch and observing the changes that occur in its viscosity. For example, when temperature versus viscosity is plotted for a starch in its unmodified form, the resulting curve will show that the viscosity of the suspension does not vary appreciably up to a certain temperature. However, within the few degrees span that this temperature is approached and exceeded, the relatively low viscosity suspnsion is transformed into a viscous solution of jellylike consistency. The viscosity of a suspension of unmodified corn starch for example, remains fairly low until its gel point of approximately 165° F. is approached and exceeded. At that point the starch granules have swollen to approximately eight times their original volume and the fluid suspension has been transformed into a thick paste. Similar observations may be made with other raw starches: tapioca and potato starch, for example, will be seen to have gel points of approximately 148° F. and 152° F., respectively. Additionally, these gel points can be depressed by the use of certain chemical additives; notably caustic soda, which is favored for its cheapness and efficiency. Thus, while the gelation temperature of unmodified corn starch can be considered the high limit in the range of practical gelation temperatures, the lower limit, through the use of chemical depressants, may be reduced to below normal room temperatures. However, adhesives having gel points below 135° F. are usually unstable over long periods of time, and except in situations where the adhesive is prepared on a continuous basis or in small enough quantities to be quickly consumed, this temperature may be taken as the practical lower limit.

Referring again, therefore, to FIGURE 1, it may be assumed that the coating applied to the exposed flute tips of the single face 1 at applicator 3 is a suspension of 10–40% raw starch in a liquid carrier with a gel point in the range of 135° F. to 165° F. As the assembled single face is drawn through the hot plate section, the steam chests, at approximately 350° F., are designed to heat the adhesive, causing gelation thereof and bonding of the outside liner to the single face.

Upon consideration it will be apparent that the conventional double backer operation just described is inefficient in many respects and is characterized by many inherent disadvatages. For example, because the board is heated by dragging it over the hot plates the frictional forces involved are high, necessitating a long draw or traction section. In a typical double backer, the length of the draw section will usually be forty feet or more. Since the frictional force to be overcome by the draw section is directly proportional to the normal force exerted on the board in the hot plate section, the pressures in the hot plate section are deliberately kept much lower than the crush strength of the board in order to avoid the necessity of an even longer draw section. This however, results in a reduced heat transfer rate and in turn necessitates a long hot plate section: again, in a typical situation, of forty feet or more in length. It will also be seen that, although the purpose of applying heat is to raise the temperature of the adhesive, the adhesive is actually insulated from the heat source by the outside liner. In situations where double or triple wall board is being formed, i.e., layers of liners spaced apart by alternating layers of medium, this problem is even more acute since the adhesive is then insulated by additional layers of liner and medium.

With regard to the quality of the board produced in the conventional process, several common defects in corrugated board are readily traced to the bonding operation in the hot plate section. Thus, warpage of the board is inevitable because of the uneven heating and drying of the board components caused by heating the assembly from one side only. As a result, in the conventional process, after the board leaves the draw section and is cut into blank lengths, reverse stacking is necessary. That is, groups of boards are manually stacked with the warpage in each group reversed with respect to the warpage of adjacent groups in the stack in order that weight of the stack may eventually alleviate the warpage. Obviously this manual operation is time consuming and an impediment to high speed automatic production. Additionally, since the board must be dragged over the steam chests, some scuffing will inevitably occur. While this will usually not be serious enough to cause board reject, it does make preprinting of the outside liner impossible and necessitates printing of each of the subsequently formed blanks on an individual basis. This situation is often aggravated by warpage of the steam chests, which in turn results in an uneven surface in the hot plate section and increased scuffing of the board. It will also be apparent that in dragging the board over the steam chests some slippage between the outside liner and single face will often occur. Since it is at this time that the bond is being formed between these components, slippage may result in poor bonding and unacceptable board. Further, the high temperatures of the hot plates precludes the use of most thermoplastic coated liners.

The mass of the steam chests also presents a problem in regulating their thermal output and makes rapid, precise control impossible. Therefore, upon grade or speed changes, some overheating or underheating of the board usually occurs, resulting in either damaged board or poor bonding.

It will also be apparent that even with a combined hot plate and draw section of eighty feet or more, the corrugating process speed must be kept fairly low due to poor thermal transfer in the hot plate section. For example, in the production of a single wall, corrugated board using a 42 pound outside liner, a common grade, manufacturing speeds are restricted to a maximum of approximately 600 feet per minute.

In addition to the high initial cost of the hot plate section, the use of steam chests also results in additional operating expenses. For example, the horsepower requirements for the draw section are necessarily high because of the frictional forces generated in the hot plate section; while the heating costs are also high as a result of the gross thermal inefficiencies encountered. Additionally, the hot plates must be periodically scraped clean and belt life is reduced by constant exposure to the high temperatures generated by the steam chests.

Despite the disadvantages described above, the conventional double backer operation has remained essentially unchanged for many years. This is because of the desirability of using inexpensive raw starch as a bonding agent, and the fact that post assembly gellation was believed necessary if raw starch was to be successfully utilized.

Applicants have found, however, that post assembly gelation is, in fact, unnecessary and that gelatinization need not take place after assembly of the substrates but may occur before the laminae are brought together. Thus, referring to the block diagram of FIGURE 3, it will be seen that in accordance with the present invention, the bonding process consists essentially of four steps: application of the suspension of raw starch in a suitable carrier to the substrate, gellation of at least a major portion of the suspension, assembly of the coated substrate and an adherend and, the application of pressure to the assembly to assure wetting of the surfaces by the adhesive.

Referring now to FIGURE 2 of the drawings, one method of applying these principles to the double backer operation of the corrugating process will be described. As in the conventional process, a pair of preheaters 16 and 17 may be provided, along with an adhesive applicator 18. With the present invention however, the conventional hot plate section 7 and draw section 8 (FIGURE 1) are completely unnecessary and may be replaced by a simple, short compression section 19. Compression section 19, as seen in FIGURE 2, may comprise a pair of endless belts 20, each of which is trained about a pair of opposing rollers 21 and 22. Intermediate the rollers, 21 and 22 a plurality of pressure rollers 23 may be provided bearing towards one another through adjacent reaches of the endless belts 20. For example, the lower set of rollers 23 may be free to rotate about their axes but otherwise fixed, while the upper rollers 23 may be suitable weighted and mounted for movement in a vertical plane as well as rotation about their axes. Alternatively, one or both sets of rollers 23 may be pneumatically or hydraulically loaded towards one another with a preselected pressure. It will also be obvious that any number of other arrangements could be utilized in place of the belt and roller arrangement just described to press the board components toward each other. The belts might be omitted entirely and a series of closely spaced, opposing rollers used, or an air chamber could be positioned on one or both sides of the board to impose a truly uniform pressure thereon.

Regardless of the particular form of apparatus used, however, the essential process step is gelation of at least a major portion of the raw starch after application thereof to the single face but before assembly of the outside liner thereto, and this step may be accomplished in several ways. For example, a series of steam pipes 24, suitably apertured throughout their length, may be positioned just downstream of the applicator to spray steam on the starch coated flute tips of the single face. By selecting the proper temperature, pressure and rate of steam flow for the particular starch formulation used and process speed, sufficient heat may be supplied to the suspension to raise its temperature to, or above its gel point and gelation thereof obtained. Thereafter, while the gelled starch is in a plastic, tacky state the outside liner 5 and single face 1 are brought together under pressure between the opposing belts 20, and as they travel down stream between the belts, bonding of the board components is accomplished. Of course, if desired, preheaters 16 and 17 may also be used to raise the temperature of the board and decrease the amount of steam needed at the pipes 24, or, alternatively, the steam pipes 24 may be dispensed with if the temperature of the single face is raised sufficiently by the preheaters 16 to cause the starch, when subsequently applied thereto, to be heated above its gel point. Additionally, the starch suspension may be warmed by heating the glue pan and the amount of heat that must be supplied to the starch by the pipes 24 further reduced.

With continued reference to FIGURE 2, a specific example of the present invention will now be described as applied to the double backer operation. As the single face 1 passes the preheater 16, the temperature of the single face is raised to 150° F. while the outside liner 5 is simultaneously heated to 190° F. by preheater 17. At applicator 18 a suspension of raw starch in a suitable carrier is applied to the flute tips of the single face. The raw starch may theoretically comprise some 10–40% by weight of the suspension; however, an optimum range has been found to be 20–35%, by weight, raw starch, and for purposes of the present illustration, a percentage of 25% by weight uncooked, potato starch will be assumed. The carrier for the raw starch may be any suitable liquid, polyvinyl alcohol being one example, but for present purposes a conventional, water base carrier will be considered. Thus, the carrier may comprise water in which a small amount of starch has been cooked to maintain the raw starch in suspension, about 10% by weight borax, sufficient caustic soda to depress the gel point of the mixture to about 140° F., and, if desired, a small amount of preservative, such as formaldehyde, if the mixture is to be stored for any length of time.

The temperature of the adhesive is increased by contact with the preheated single face and in the interval between application to the single face and contact by the steam jets, the temperature will increase to about 105°–115° F. Therefore, it is necesary to raise the adhesive an additional 25°–35° F. by means of the steam spray from pipes 24 in order to attain the assumed gel temperature of 140° F. By means of experimentation it has been found that under the conditions described above, 1.7 pounds of steam per thousand square feet of board is sufficient to attain gelation. A dry, saturated steam functions most efficiently from a heat transfer point of view, although some variance from these conditions is, of course, possible.

After the starch adhesive has been heated by the steam jets, the single face 1 and the outside liner 5 are brought together between the opposed endless belts 20. At this time, the adhesive will usually be completely gelled and is a tacky condition and it is only necessary to bring the outside liner into contact with the adhesive covered flute tips of the single face to obtain bonding. It should also be noted, however, but should the adhesive not be completely gelled prior to assembly of the single face and outside liner, the amount of heat imparted to the various board components by the preheaters and steam spray will be sufficient to complete gelatinization of the starch as the components pass between the belts 20 without further heat addition.

Additionally, while it would be preferable to formulate the starch suspension so that all liquid would be absorbed by the starch granules during gelatinization, in practice there will usually be a small amount remaining after gelation that must be removed from the adhesive before it can be considered fully cured. However, most of this moisture will be absorbed by the board components as they travel through the pressure section and any residue will either by evaporated or absorbed after the board leaves the combiner.

While the amount of pressure necessary in the compression section to obtain bonding need only be enough to cause wetting of the surfaces to be bonded, an increase in pressure will greatly decrease the amount of time needed to obtain an adequate bond. Therefore, in practice, maintenance in the compression section of an average pressure of about 1 p.s.i. will decrease bonding time to the point where a compression section of approximately 20 feet in length is adequate for manufacturing speeds of 600 f.p.m.

As an alternative to heating the uncooked starch to obtain gelation thereof, the gel point of the starch may be reduced below its temperature and gelation obtained in this way. Thus, since the present invention obviates the necessity of post assembly gelation and permits gelatinization of the starch while it is still accessible, a gel point depressing chemical may be applied directly to the starch covered flute tips of the single face before it joins the outside liner in the combining section in an amount sufficient to lower the gel point of the starch below its temperature at the time of application of the additive. Thus, as seen in FIGURE 4, as the single face 1 approaches the opposed belts 20 carrying a previously applied coating of starch 25 on each of its flute tips, a series of nozzles 26 (only one of which is shown) sprays any of the well known gel point depressing chemicals, such as caustic soda, onto the starch in a quantity sufficient to reduce the gel point thereof below its temperature. An exhaust hood 27 may be provided to wtihdraw excess additive through the exhaust conduit 28.

As another variation of the above described mtehods of obtaining gelation, it will be apparent that the starch might be both heated to raise its temperature and chemically treated to lower its gel point to that temperature.

From the above description it will be apparent that the present invention provides a method of forming corrugated board which, in comparison with the conventional double backer operation, is much more efficient, produces a superior grade of board and requires less expenditure for both equipment and operating costs.

Specifically, it will be noted that the entire hot plate section of the conventional corrugator may be completely eliminated. Since the hot plates generally account for approximately half the cost of the double backer, their elimination results in a substantial reduction in the initial cost of the corrugating machine. Of equal importance is the saving in costly floor space that may be gained when applying the principles of the present invention to the corrugating process. Thus, the standard hot plate section and draw section, typically 80 feet or more in length, may be replaced by a compression section of only 20 feet in length.

Additionally, it will be seen that the operating and maintenance expenses characteristic of a conventional corrugator are drastically reduced by means of the present invention. For example, the steam required by the pipes 24 is only about one third of that ordinarily supplied to the hot plate section of a conventional double backer; while the elimination of the frictional forces usually encountered in the hot plate section substantially decreases power requirements. Also, belt life is increased by elimination of the hot plates and the number of steam lines, valves, traps, separators, etc., is substantially decreased.

It should also be noted that aside from direct savings in equipment and operational costs, the present invention provides additional economies permitting high speed, automatic, production of warp free, unscuffed board. Thus, production speeds may be at least doubled and warp and scuffing substantially eliminated. Additionally, the possibility of slippage between the single face and outside liner during bonding is avoided since there is no longer any dragging of the board components over a stationary surface.

In a variation of the double backer operation described above, that is, when double or triple wall board is produced, production speeds must be subtsantially decreased to permit the heat from the steam chests to penetrate the several layers of paper and gel the adhesive. Since, by means of the present invention however, all, or at least a major portion of gellation occurs before assembly of the board components, production speed is no longer affected by the number of layers of medium and liner to be laminated and double and triple wall board may be run through the double backer at the same speeds as single wall board.

Thus, with reference to FIGURE 5, it will be seen that when a triple wall board 29 is being produced, three single face components 30a, 30b and 30c each have a coating of the raw starch suspension applied to their exposed flute tips by applicators 31a, 31b and 31c. Thereafter, steam may be applied to the coating by pipes 32a, 32b and 32c, gelling at least a major portion of the starch before the three single face components and the outside liner 33 are brought together in the combining section 34. This process can be contrasted with the conventional post assembly method wherein it would be necessary for the heat applied to the assembled components to penetrate the outside liner and two layers of single face before all starch would be completely gelled. While gelation by means of heating with steam has been described, it will be apparent that any of the methods described previously for obtaining pre-assembly gelation would be applicable here also.

The single face operation in the production of corrugated board is another area in which the present invention may be used to advantage. Thus, referring to FIGURE 6 it will be seen that a web of corrugating medium 35 is passed between intermeshing corrugating rollers 36 and 37, whereby it is given a fluted configuration. A web of inside liner material 38 is passed over an applicator 39 which deposits a series of spaced lines of adhesive thereon in registration with the flute tips of the medium to which it will be joined. Just before the medium and liner are brought together in the pressure nip formed by rolls 37 and 40, a series of steam pipes 41 spray steam on the lines of adhesive, gelling it and permitting the formation of an almost instantaneous bond in the following pressure nip. While in the single face operation just described, the starch and hence, the steam, are applied to the liner, it will be apparent that in single face operations wherein the adhesive is applied directly to the flute tips of the medium, the steam in that case would be directed onto the medium.

While, from the foregoing, the many advantages to be gained from modifying conventional corrugator operations in accordance with the present invention are readily seen, it will be equally apparent that the invention may be advantageously applied to a number of other bonding operations.

With reference to FIGURE 7 for example, it will be seen that the present invention can be used in laminating one or more webs of material to give an almost instantaneous bond. Thus, as seen in FIGURE 7, a suspension 42 of raw starch granules in a suitable liquid carrier is applied to a continuous web 43 and is doctored by rod member 44. As in the double backer operation described previously, steam may then be sprayed onto the starch coating, as by nozzles 45, under such conditions as to gel the starch prior to entry into the nip formed by the pressure rolls 46 and 47. One major difference between the embodiments of the invention shown in FIGURES 2 and 7 is the fact that in the double backer operation, a relatively low combining pressure must be used in order to prevent crushing of the corrugating medium flutes, while in the laminating operation shown in FIGURE 7, the pressure exerted on the lamina by rolls 46 and 47 may be appreciably higher.

Since, as noted previously, the combination of pre-assembly gelation and moderately high bonding pressures renders possible an almost instantaneous bond, it will be obvious that the present invention offers significant process speed increases over conventional laminating processes. Additionally, it has also been noted that starch consumption is substantially decreased. For example, in bonding two paper webs using modified starch or dextrine solutions at 30-40% solids content, the maximum process speed has been about 600 f.p.m. with a starch consumption of approximately 3 pounds per 1000 square feet. In contrast, where a 20% by weight raw starch suspension was applied to one of the webs, gelled by means of steam prior to combining of the webs and the webs then brought together in a pressure nip of approximately 200 p.l.i., laminator speeds were increased to 1000 f.p.m. and starch consumption cut to 1 pound per 1000 square feet.

Another area in which the present invention will be seen to provide significant advantages is in the production of paper bags; particularly the tubing operation. Thus, as seen in FIGURES 8 and 9, a web of paper 48, as it is rolled into a tubular form 49 prior to being cut into bag blank lengths, has a narrow ribbon of uncooked starch suspended in a suitable liquid carrier applied to one longitudinal edge by means of a small tube 50. A steam nozzle 51 applies steam to the starch, gelling it, just before the other longitudinal edge of the web is rolled into contact therewith. A pair of nip rolls 52 and 53 then subject the assembled edges with the gelatinized starch therebetween to a fairly high pressure providing an almost instantaneous bond.

Many other areas are, of course, susceptible to improvement by means of present invention: the production of paper cups, envelopes and spiral tubing, to name but a few. However, since it will be obvious to those skilled in the art that the present invention finds application in any environment in which a fast bonding, inexpesive adhesive is desired, applicants do not intend to be limited by the specific examples given but only by the scope of the appended claims.

We claim:
1. In the process of manufacturing corrugated board, including the steps of corrugating a continuous web of corrugating medium to provide a series of flutes therein, and applying a coating consisting of at least an ungelatinized starch suspended in a carrier to the tips of said flutes, the improvement comprising:
 (a) gelatinizing at least a major portion of said ungelatinized starch after it has been applied to said flute tips, and
 (b) subsequent to said gelatinizing step, applying a continuous web of paper to the gelatinized starch covered flute tips.
2. The method of claim 1 wherein:
 (a) said gelatinizing step is accomplished by lowering the gel point of said suspension of ungelatinized starch to a temperature below the temperature of said ungelatinized starch at the time said gel point is lowered.
3. The method of claim 2 wherein:
 (a) the gel point of said suspension is lowered by applying a solution of caustic soda thereto.
4. The method of claim 1 wherein:
 (a) said gelatinizing step is accomplished by raising the temperature of said suspension of ungelatinized starch to a temperature equal to at least the gel point of said suspension.
5. The method of claim 4 wherein:
 (a) the temperature of said suspension of ungelatinized starch is raised to at least the gel point thereof by directing steam directly on said suspension.
6. The method of claim 5 wherein:
 (a) said steam is a dry steam.
7. The method of claim 1 further comprising:
 (a) maintaining said web of corrugating medium and said web of paper applied to the flute tips of said medium in a compression sectioned under an applied pressure of approximately 1 pound per square inch.

References Cited

UNITED STATES PATENTS

| | | | |
|---|---|---|---|
| 1,851,709 | 3/1932 | Laucks et al. | 156—321 |
| 2,051,025 | 8/1936 | Bauer | 156—336 XR |
| 2,102,937 | 12/1937 | Bauer | 106—213 |
| 2,197,754 | 4/1940 | Bauer et al. | 156—336 |
| 2,212,557 | 8/1940 | Bauer | 156—336 |
| 2,236,056 | 3/1941 | Grimm | 156—205 |
| 2,346,644 | 4/1944 | Bauer et al. | 156—318 XR |
| 2,496,440 | 2/1950 | Caesar | 156—205 XR |
| 3,151,996 | 10/1964 | Desmarais | 106—213 |

EARL M. BERGERT, *Primary Examiner.*

D. J. FRITSCH, *Assistant Examiner.*

U.S. Cl. X.R.

156—318, 336, 470